US010535004B2

(12) United States Patent
Kreis et al.

(10) Patent No.: US 10,535,004 B2
(45) Date of Patent: Jan. 14, 2020

(54) PREDICTING AN INTERFACE CONTROL ACTION OF A USER WITH AN IN-VEHICLE USER INTERFACE

(71) Applicant: DAIMLER AG, Stuttgart (DE)

(72) Inventors: Marius Kreis, Huenfeld (DE); David Kruzic, Stanford, CA (US); Khaled Mosalem, Los Altos Hills, CA (US); Rigel Smiroldo, San Jose, CA (US)

(73) Assignee: DAIMLER AG, Stuttgart (DE)

( * ) Notice: Subject to any disclaimer, the term of this patent is extended or adjusted under 35 U.S.C. 154(b) by 801 days.

(21) Appl. No.: 15/105,796

(22) PCT Filed: Dec. 6, 2014

(86) PCT No.: PCT/EP2014/003279
§ 371 (c)(1),
(2) Date: Jun. 17, 2016

(87) PCT Pub. No.: WO2015/090531
PCT Pub. Date: Jun. 25, 2015

(65) Prior Publication Data
US 2016/0321545 A1 Nov. 3, 2016

(30) Foreign Application Priority Data

Dec. 19, 2013 (GB) .................................. 1322614.7

(51) Int. Cl.
*G06N 5/02* (2006.01)
*G05B 13/02* (2006.01)
(Continued)

(52) U.S. Cl.
CPC ............. *G06N 5/022* (2013.01); *G05B 13/02* (2013.01); *G05B 13/048* (2013.01);
(Continued)

(58) Field of Classification Search
CPC ........ G06N 5/022; G06N 20/00; G06N 20/10; G06N 20/20; G05B 13/02; G05B 13/048; G06F 3/04842; B60W 50/08
(Continued)

(56) References Cited

U.S. PATENT DOCUMENTS 7,006,881 B1 2/2006 Hoffberg et al.
8,429,103 B1 4/2013 Aradhye et al.
(Continued)

FOREIGN PATENT DOCUMENTS

CN 102116637 A 7/2011
CN 102147263 A 8/2011
(Continued)

OTHER PUBLICATIONS

International Search Report in related International Application No. PCT/EP2014/003279 dated Mar. 18, 2015.
(Continued)

*Primary Examiner* — Shane D Woolwine
(74) *Attorney, Agent, or Firm* — Patent Portfolio Builders PLLC

(57) ABSTRACT

A method for predicting an interface control action of a user with an in-vehicle user interface involves collecting and storing data. The data can be vehicle data about the vehicle and its environment collected from at least one sensor of the vehicle and user data about user interactions with the user interface and/or different applications inside the vehicle. Likelihoods are assigned to at least two possible interface control actions by the user based on the collected and stored data. At least one most likely interface control action is determined from the likelihoods and the user is presented with the at least one most likely interface control action so that it is selectable and performable with one single user interaction with the user interface.

14 Claims, 1 Drawing Sheet

(51) Int. Cl.
*G06N 20/20* (2019.01)
*G05B 13/04* (2006.01)
*G06F 3/0484* (2013.01)
*G06N 20/10* (2019.01)

(52) U.S. Cl.
CPC ......... *G06F 3/04842* (2013.01); *G06N 20/20* (2019.01); *G06N 20/10* (2019.01)

(58) Field of Classification Search
USPC .............................................. 706/21, 23, 46
See application file for complete search history.

(56) References Cited

U.S. PATENT DOCUMENTS

| | | | |
|---|---|---|---|
| 8,855,913 | B2 | 10/2014 | Certin |
| 8,951,165 | B2* | 2/2015 | Morris .................. A61B 5/1118 482/8 |
| 2009/0327977 | A1 | 12/2009 | Bachfischer et al. |
| 2011/0022393 | A1 | 1/2011 | Wäller et al. |
| 2011/0238289 | A1 | 9/2011 | Lehmann et al. |
| 2012/0059827 | A1* | 3/2012 | Brittain ............. G06F 16/24556 707/741 |
| 2012/0158212 | A1 | 6/2012 | Ying et al. |
| 2012/0239607 | A1 | 9/2012 | Rao et al. |
| 2012/0266108 | A1 | 10/2012 | Lien et al. |
| 2013/0166096 | A1 | 6/2013 | Jotanovic |
| 2014/0278051 | A1* | 9/2014 | McGavran ............ G01C 21/00 701/400 |
| 2015/0081279 | A1* | 3/2015 | Suleman ................ G06F 16/35 704/9 |

FOREIGN PATENT DOCUMENTS

| | | |
|---|---|---|
| CN | 102506885 A | 6/2012 |
| CN | 102682041 A | 9/2012 |
| EP | 1 742 145 A2 | 1/2007 |
| EP | 2 369 299 A1 | 9/2011 |

OTHER PUBLICATIONS

Search Report in corresponding Great Britain Application No. GB1322614.7 dated May 27, 2014.
Koychev et al.; "Adaptation to Drifting User's Interests"; 2000; pp. 1-7; Augustin, Germany.
Tsymbal; "The problem of concept drift: definitions and related work"; Apr. 29, 2004.
Masud et al.; "A Multi-partition Multi-chunk Ensemble Technique to Classify Concept-Drifting Data Streams"; PAKDD 2009, LNAI 5476; 2009; pp. 363-375.
Langley; "Machine Learning for Adaptive User Interfaces"; Intelligent Systems Laboratory; Daimler-Benz Research and Technology Center; Cached by the Wayback Machine; Feb. 24, 2012; pp. 1-5.
Álvarez-Cortés et al.; "Current Trends in Adaptive User Interfaces: Challenges and Applications"; Electronics Robotics and Automotive Mechanics Conference, 2007; CERMA 2007; Sep. 25-28, 2007; pp. 312-317; Cuernavaca, Morelos, Mexico.
Written Opinion in related International Application No. PCT/EP2014/003279 dated Mar. 18, 2015.
Office Action dated Aug. 3, 2018 in related CN Application No. 201480067913.3 (all references cited in OA have previously been made of record).
Office Action dated Mar. 2, 2018 in related CN Application No. 201480067913.3 (reference US 2013/0166096 previously cited in IDS on Jun. 17, 2016).
Wikipedia, "Ensemble Learning," Apr. 25, 2019, https://en.wikipedia.org/w/index.php?title=Ensemble_learning&oldid=894084312.

* cited by examiner

PREDICTING AN INTERFACE CONTROL ACTION OF A USER WITH AN IN-VEHICLE USER INTERFACE

BACKGROUND AND SUMMARY OF THE INVENTION

Exemplary embodiments of the present invention relate to a method for predicting an interface control action of a user with an in-vehicle user interface. Exemplary embodiments of the invention further relate to an in-vehicle user interface with a memory unit, a processing unit, and a display unit.

Many vehicles currently have an in-vehicle user interface providing a user with a vast amount of possible interface control actions. For example, a single in-vehicle user interface and/or different applications inside the vehicle may be used to choose a variety of actions such as listen to music, make a phone call, and adjust the temperature in the vehicle. All these different interface control actions usually cannot be presented to a user at the same time. This results in complicated menus, where the user has to perform several tasks of choosing sub-menus and options, before an interface control action finally is selected. Several efforts have been met already to increase the usability of user interfaces.

The European patent document EP 2 369 299 A1 and US patent document US 2013/0166096 A1 both disclose a predictive destination entry system for a vehicle navigation system to aid in obtaining destinations for a vehicle. The navigation system comprises a memory for storing data, a display coupled with the vehicle, and a processor coupled with the display and with a memory. The processor is configured to predict a destination for the vehicle based on the data stored in the memory.

US patent document U.S. Pat. No. 8,429,103 B1 discloses an apparatus and methods for providing machine-learning services for a mobile platform. A machine-learning service executing on a mobile platform can receive data related to a plurality of features, wherein the received data comprises a called party of a telephone call to be originated by the mobile platform. The output by the machine-learning services comprises a prediction of a volume setting and/or a mute setting of the mobile platform.

Exemplary embodiments of the invention are directed to improving the usability of an in-vehicle user interface.

Exemplary embodiments of the invention improve the usability of an in-vehicle user interface using a method for predicting an interface control action of a user of such an in-vehicle user interface with several steps. A first step comprises collecting and storing data, at least vehicle data about the vehicle and its environment from at least one sensor of the vehicle and user data about user interactions with the user interface and/or different applications inside the vehicle. This collecting and storing of data can be performed prior to the consequent steps, but also prior and/or in parallel to the consequent steps, meaning that data can be collected and stored as a background process. The second step comprises assigning likelihoods to at least two possible interface control actions by the user based on the collected and stored data. This assigning of likelihoods can be a continuous process, where the likelihoods are updated in specific time-intervals or whenever new data is collected and/or stored. The third step comprises determining at least one most likely interface control action from the likelihoods. In particular, the at least one most likely interface control action may be a subset of any size of the complete set of possible interface control actions. The fourth step comprises providing the user with the at least one most likely control action so that it is selectable and performable with one single user interaction with the user interface. All the above steps can be performed consecutively or in parallel, meaning that data, likelihoods, and the at least one most likely interface control action may be dynamic. So, they can be updated after a fixed time-interval or whenever new data is available.

The resulting advantage is that only one user interaction with the user interface is necessary for a desired control action or task. Furthermore, only a small set of interface control actions is shown to the user at a time so the user can perform an interface control action fast and is not distracted by a huge amount of possible interface control actions at a time. As the likelihoods that determine which interface control actions are made available to the user depend on the data, that is, prior information about the vehicle, its environment and user interactions with the user interface and/or different applications inside the vehicle, the method provides the user with situational or context-specific control actions. Accordingly, it is possible that in a specific situation or context, interface control actions that, based on collected and stored data, are most likely for the user choose are made available to the user. Hence the usability of an in-vehicle user interface is increased in a dynamic way.

The method can be improved, so that a larger likelihood is assigned to frequently used interface control actions when assigning the likelihoods. The resulting advantage is that it is more likely that interface control actions that are chosen more frequently are made available to the user, which means they are easier and faster to choose.

The method can be further refined so that a larger likelihood is assigned to recently used interface control actions when assigning the likelihoods. This results in a more user friendly method, since, if the user picks up a new habit, such as using a previously unused interface control action or using a previously used interface control action in a new context, a larger likelihood is assigned to this new habit, i.e., the respective interface control action. As a result, the respective interface control action is made available to the user in the "making available" step much easier than in one of the previously described embodiments of the invention. Accordingly, the method quickly adapts to changing habits of the user, as the adaptation is not, or less, influenced by old patterns of interface control actions of the user.

A further refinement of the method is that only data younger than a given age are taken into account when assigning the likelihoods. This ensures that very old data, data that is not relevant for the prediction of currently preferred interface control actions of the user, does not influence the outcome of the method. Furthermore, computing time and memory is saved.

In addition, it is possible that collecting and storing data includes collecting and storing data, in particular data about the user, from and to a cloud. Here, the term "cloud" refers to a remote IT infrastructure. That means pre-processed data as well as events or further data from the outside world, which are not available to sensors of the car or the user interface directly, can be used to predict an interface control action.

Next, the methods can be improved if a classifier is built to calculate the likelihoods for the at least two possible interface control actions based on the collected and stored data, and these calculated likelihoods are then assigned to the at least two possible interface control actions. The use of a classifier gives the advantage that a systematic approach is realized for achieving a local, dynamic learning system that takes advantage of a vast amount of already existing knowledge to increase the usability of the user interface. Accordingly, it is possible to choose a suitable classifier out of the many classifiers that already exist.

When choosing the respective classifier for the embodiment of the invention, one only has to remind several criteria or needs that have to be met by a suitable classifier. First, the classifier needs to be an online or iterative learning algorithm. This means training can be done dynamically, that is, by taking one data point at a time instead of requiring a lot of saved data before any training can take place. Second, the classifier needs to work well with a so-called "partial-state". That means if some data is not available, i.e. a data set is not complete, the classifier should still give reasonable likelihoods using whatever data is available. This is especially important when data from the cloud is used, as the cloud is not always available or reliable. Third, the classifier should not need to know the total number of classes, which corresponds to the number of control actions, beforehand, so that the classifier grows as it is trained by more and more control actions that are discovered and used by the user. Fourth, the classifier needs to be simple to implement, easy to debug, and robust. Fifth, it would be advantageous to construct an ensemble version of the classifier with a single classifier model without data redundancy. This allows use of an ensemble classifier in which variance and bias trade-off can be fine-tuned in real time by changing ensemble hyper parameters. One classifier that meets these requirements is the naïve Bayes classifier. But in principle any classifier meeting the above criteria is fit for the inventive method.

It is also possible to combine different classifiers so as to compensate for specific disadvantages of a given classifier. In particular, a naïve Bayes classifier can be used as a primary learner for the method so as to get a first estimate of the likelihoods; then e.g. a random forest classifier can be used as a supplement to increase the overall accuracy of the method under specific circumstances. When those circumstances are not met, the method simply relies then on the results of the naïve Bayes classifier.

The method can further be modified so that the classifier is an ensemble classifier with several individual classifiers, where each individual classifier is built on a data chunk of the collected and stored data. This provides the advantage of a very flexible classifier that can adapt to a growing set of collected and stored data, in particular by building a new individual classifier for newly collected and stored data. Furthermore, specific sets or sub-sets of data can be ignored by erasing the corresponding individual classifier that is built on the data to be left out.

A further refinement of the method can be achieved if the data chunks are weighted with a bias depending on the age of the collected and stored data contained within, in particular with the bias giving more weight to data chunks with recent data. Equivalently, the individual classifiers built on the respective data chunks can be weighted with a bias. This adds a selection bias to our ensemble classifier, more specific, it adds a temporal bias that takes into account recently collected data more than older data.

This gives two technical advantages. First, our specific realization of the bias allows the assumption of a static setting, since the data in each chunk is static and unchanging. Thus, algorithms and techniques that excel in static situations can be used for the classifiers. For example, both the Bayesian and random forest classifiers described above assume static correlations. The combination of such "static" classifiers with the weights, however, results in the ensemble classifier approximating a dynamic system, as the weights are dynamic. Since people change, user behavior is typically dynamic, and, thus, temporal bias is critical in predicting interface control action of a user. Second, the temporal bias provides a memory horizon, where data older than a certain amount or age can no longer influence the performance of the ensemble classifier. Thus, the long-term resource use of the user interface can be tweaked by a clever manipulation of this memory horizon, that is, by choosing a suitable weight-decay for older data and by not storing, that is, by deleting data stemming from before the memory horizon and the respective classifiers. This is much cheaper than storing all data for the lifetime of the vehicle or user.

As for modeling the weight-decay, different schemes, in particular a linear or an exponential scheme can be used. In a linear scheme the weights decay by a fixed amount. In case of an exponential decay, the weights would decay by an amount relative to each other.

With regard to predicting user behavior, it is useful to have a higher weight-decay for more dynamic users, since older data is not useful for a very dynamic user. Also it is useful to have a lower weight-decay for less dynamic users, where old data is still useful for identifying correlations in user and vehicle data. However, for less dynamic users, recent data and older data should share very similar correlations, and thus, it is not as critical to keep around old data for those less dynamic users either. A high weight-decay is thus desirable in both cases. The trade-off here is accuracy. A classifier needs a certain critical mass of data based on the complexity of the classifier being used. Thus, the key is to pick the highest weight-decay possible that still keeps the desired critical mass of data based on the chosen algorithm for the classifier. This is very much related to the bias/variance trade-off frequently spoken about in machine learning literature. Specifically, a high weight-decay does well with high bias and low variance algorithms or classifiers.

The weighting results in the overall advantage that classifiers that are based on new data, which means data stemming from recent behavior or situations, have more influence on the output of the ensemble classifier, that is, on the likelihoods assigned to the interface control actions. As a consequence, the method adapts better to changing habits of a user.

Finally, it is advantageous if each data chunk contains all data, or data points, stemming from a time-interval specific for each data chunk, where, in particular, time-intervals assigned to one data chunk may overlap with time-intervals assigned to other data chunks, so that specific data may be part of more than one data chunk. In particular, there are two parameters related to chunk overlap: overlap percentage and stack depth. Overlap percentage refers to which percentage data samples exist in multiple data chunks. For example, a 10% overlap means, that, if sampled randomly, only 10% of the samples' data points would be present in multiple data chunks. 100% overlap would mean that every sample is present in multiple data chunks. Coupled with data chunk width, this parameter controls when a new data chunk must be created. Stack depth refers to the maximum number of data chunks a single data sample can be present within. For example, a stack depth of two means that a data sample or data point can exist in at most two different data chunks. Accordingly, combining stack depth with chunk overlap, a data chunk overlap of 100% with a stack depth of two would mean that every sample is present in exactly two data chunks.

This results in the advantage that each individual classifier, corresponding to the data chunk it is built on, represents correlations in the data in a specific time slot. Accordingly, specific time-intervals, such as, e.g., time-intervals during holidays, can be easily selected, and consequently ignored or favored for predicting user behavior. By setting the length of the time-intervals, the quality of each individual classifier can be adjusted. Here, a long time-interval leads to an enhanced accuracy of the individual classifiers in combination with a reduced flexibility of the ensemble classifier, and a short time-interval leads to a reduced accuracy of the individual classifiers in combination with a very flexible ensemble classifier. Furthermore, the more the time-intervals of distinct data chunks overlap the smoother the behavior of the ensemble classifier gets, preventing "jumps" in the predicting of user behavior that might surprise and irritate the user.

It is also advantageous to choose a stochastic overlap percentage, in particular with a mean of 100%. This means that, on average, the chunk overlap percentage is, e.g., 100%. In this case, the random nature of this setting helps to control the influence of the bias caused by the selection of the data chunks on the performance on the ensemble classifier. With the random nature, the desired temporal bias is still present, but the undesired bias related directly to the data chunk width is mitigated. It is advantageous to maintain a stack depth of exactly two. Ideally, these parameters are fine-tuned to each particular user in order to achieve the best prediction results of the ensemble classifier.

The invention further provides an in-vehicle user interface with a memory unit, a processing unit and a display unit. Here, the memory unit is for collecting and storing data, at least vehicle data about the vehicle and its environment from at least one sensor of the vehicle and user data about user interactions with the user interface and/or different applications inside the vehicle, the processing unit, with access to the memory unit, is for assigning likelihoods to at least two possible interface control actions based on the collected and stored data, and for determining at least one most likely interface control action from the likelihoods, and the display unit is for making available, in particular presenting, to the user the at least one most likely control action so that it is selectable and performable with one single user interaction with the user interface.

BRIEF DESCRIPTION OF THE DRAWING FIGURES

By considering following detailed description of some exemplary embodiments in conjunction with the accompanying drawings, the teachings of the present invention can be readily understood, at least some additional specific details will appear. Herein:

DETAILED DESCRIPTION

Figure 1:
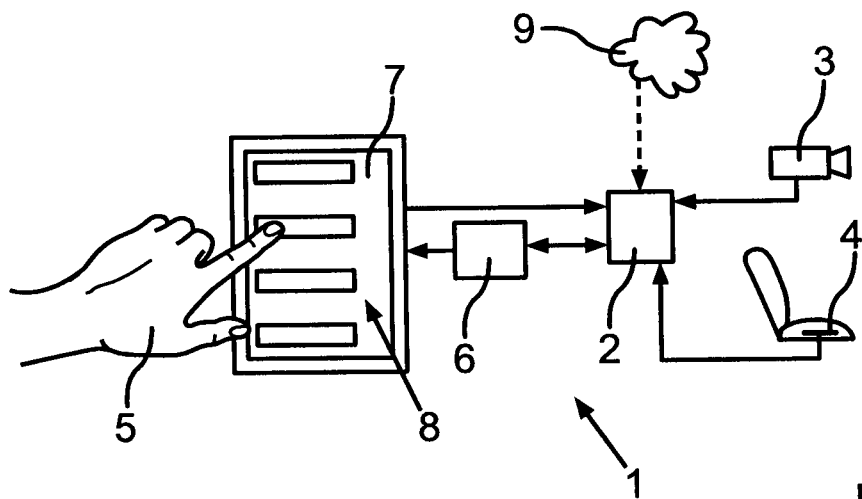
FIG. 1 shows an in-vehicle user interface according to an exemplary embodiment of the invention.

FIG. 1 shows an in-vehicle user interface 1 according to an exemplary embodiment of the invention. It comprises a memory unit 2 that collects data from at least one sensor, in the present example a first sensor 3, a camera, and a second sensor 4, a seat sensor. Here, the memory unit 2 also collects data from the cloud 9 via a wireless connection. This wireless connection might not be available all the time. Furthermore, the memory unit 2 collects and stores data that it receives from a display unit 7 about interface control actions of a user 5. A processing unit 6 can access and modify the data stored in the memory unit 2. The processing unit 6 is connected to the display unit 7, which is a touch screen in this example. It also determines at least one most likely interface control action and transmits that information to the display unit 7. The display unit 7 presents to the user 5 a set 8 of the one or more most likely interface control actions so that the at least one most likely interface control action is selectable and performable with one single user interaction with the user interface 1. In the current example, the set 8 consists of a list of four most likely interface control actions, the display unit 7 presents the set 8 to the user 5. Accordingly, as the display unit 7 has a touch screen, the user 5 can choose and perform one of the four most likely interface control actions by simply touching the respective icon in the present example.

A brief description of how such a user interface 1 is working is now presented. In a specific situation, the memory unit 2 collects data about the vehicle and its environment from at least one sensor 3, 4. In the current example this is the first sensor 3, the camera, and the second sensor 4, the seat sensor. In this case the camera 3 might collect data about, for example the weather, and the seat sensor 4 about the presence of a front seat passenger. In addition, in this specific situation, the memory unit 2 might collect data about the user from the cloud 9. The data collected in the specific, present situation is then made available to the processing unit 6. The processing unit 6 basically compares the data of the present situation with the stored data in the memory unit 2, and, as the stored data also includes user data about interface control actions of the user 5, assigns likelihoods to several possible interface control actions that reflect the strength the correlation of the possible interface control actions with the data of the present situation. This can be done by an analysis of past situations that are similar or identical to the present situation and the interface control actions the user 5 has used and/or selected in these past situations. The processing unit 6 then determines which possible interface control actions have the highest likelihood, that is, which possible control actions are most likely to be chosen in the specific, present situation by the user 5, chooses the most likely ones, and makes in the display unit 7 present these to the user as a set 8 of the most likely control actions. In the current example, a set 8 of four interface control actions is presented to the user 5. The user 5 then can choose one of these interface control actions that are deemed most likely in the present situation by the user interface 1 with a single user interaction. That is, in the present example, a touch on the touch screen 8 may suffice to perform a task that usually requires more than one user interaction, such as listening to a specific song the user 5 likes very much. So, for example, the in-vehicle user interface 1 might register a correlation between sunset registered by a camera of the vehicle, the driver being alone in the vehicle, that is, the front passenger seat being empty, and the user listening to Bach. Consequently, when the user interface 1 notices that it is sunset and the front passenger seat is empty, it might present to the user 5 an interface control action listen to Bach music the user 5 only needs to activate with a single touch on the touch screen.

Figure 2:
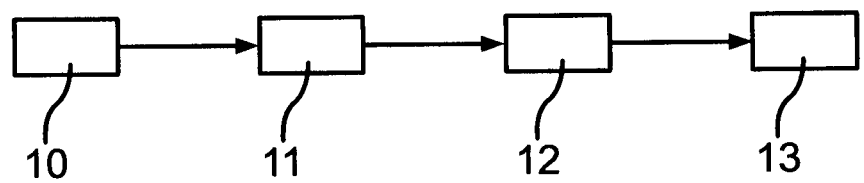
FIG. 2 shows a diagram of an exemplary embodiment of the inventive method.

FIG. 2 shows a schematic diagram of an exemplary embodiment of the inventive method. Here, the first step 10 is "collecting and storing data" about the environment from different vehicle sensors, data, in particular about a user 5, from the cloud 9 (FIG. 1), and data from user interaction with the user interface 1 (FIG. 1), namely different applications inside the vehicle controlled by the user interface 1

(FIG. 1). Here, each data has a time stamp to determine its age. This time stamp is used in other steps of the method to determine the age of the data as well as the age of the correlations.

Figure 3:
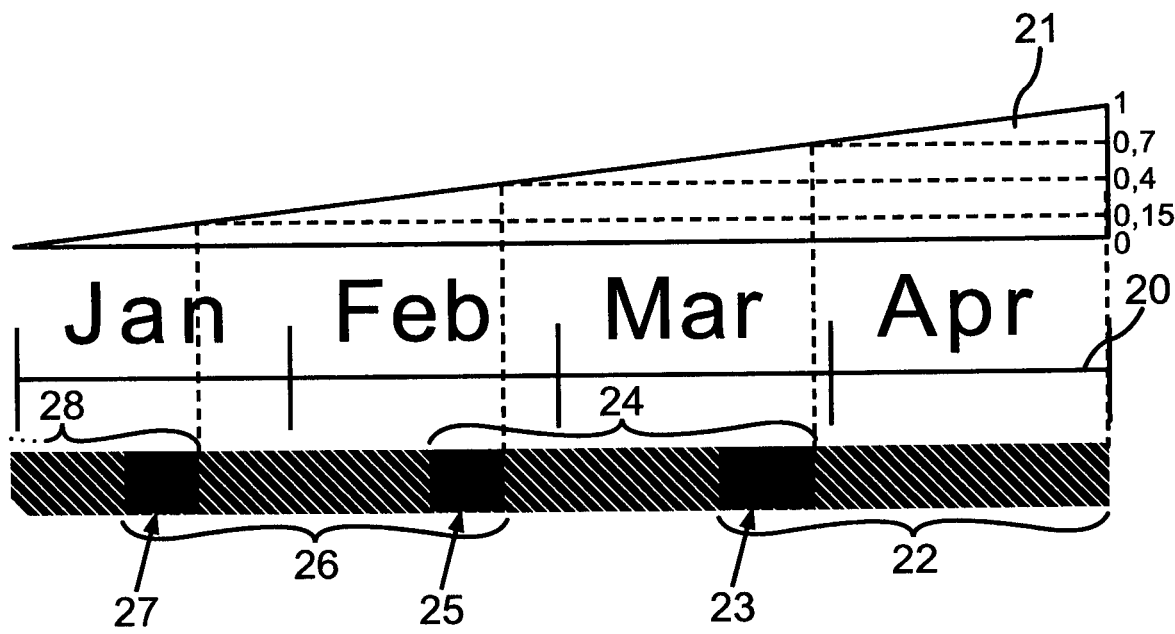
FIG. 3 shows an exemplary illustration of critical hyper parameters that determine the influence of data chunks on an ensemble classifier.

The second step 11 comprises "assigning likelihoods" to possible interface control actions based on the collected data. In the present example, a classifier that is built on the stored data calculates these likelihoods. Here, the classifier is an ensemble classifier with several individual classifiers, where each individual classifier is built on a sub-set of the collected data referred to herein as a data chunk. In state of the art ensemble classifiers, the selection of the data chunks is randomized. This differs from our approach. In this example, the data belonging to one data chunk are data, in particular the complete data, which has been collected within a specific interval in time. As a consequence, it makes sense to calculate an age of the data chunks based on the time-stamps on the data contained in such a data chunk. Then, a weight is assigned to each chunk, where, in the present example, more recent chunks are weighted more heavily. This adds a selection bias to the ensemble classifier, more specific, it adds a temporal bias that takes into account recently collected data more than older data. In our example, a weight-decay can be set in a way that only around five months' worth of user and vehicle data are stored. In FIG. 3, the methodology of weighting and creating the data chunks by choosing the right data for the chunk and the right weight-decay is explained with an example.

After calculating the likelihoods and "assigning likelihoods" 11, the third step 12 is "determining" the at least one most likely interface control action in the specific situation. This can be, for example, a list, where all possible interface control actions are listed and sorted according to their likelihood.

Finally, the fourth step 13 is "making available" to the user the at least one most likely control action so that the control action, in the example of FIG. 1 a set 8 (FIG. 1) of interface control actions, are selectable and performable with one single user interaction with the user interface 1 (FIG. 1). For example, a specific number of the most likely interface control actions in a specific situation might be presented to the user, e.g. together with one more option that provides the user the possibility to choose another interface control action. The latter is useful if the method of predicting the interface control action the user 5 (FIG. 1) wants to choose in the specific situation should fail.

FIG. 3 shows an illustration of the critical hyper parameters that determine the influence of the data chunks on the ensemble classifier. The timeline 20 extends over four months here, i.e. January, February, March, and April in this example. Below the timeline 20, several hatched areas and three filled areas 23, 25, 27 can be seen. Each hatched area together with the adjacent filled areas form areas 22, 24, 26, 28 that represent a time interval associated with a data chunk. So, in the present example, each data chunk contains data of about six weeks of time. The length of time associated with each data chunk, the data chunk width, affects the quality of the prediction of the ensemble classifier. A larger data chunk width, e.g. months, makes the individual classifiers stronger, while a shorter data chunk width sacrifices individual classifier accuracy and strengthens the dynamic nature of the ensemble classifier. Thus, in principle, the data chunks should be longer for people who change behavior and habits infrequently, and shorter for those people, who of opposite behavior. A particularly advantageous data chunk width is between three and six weeks of time.

The filled areas 23, 25, 27 designate data chunk overlap. As data samples need not be associated with only a single data chunk, data chunks may overlap. That is, an older data sample within one, younger, chunk may also be present as a younger data sample in another, older chunk. This is desirable as it smoothens out the behavior of the method when a new data chunk is created for an individual classifier of the ensemble classifier. Specifically, after the creation of a new chunk, the classifier built on this most recent data chunk is usually very immature, i.e. inaccurate, but yet highest weighted. This leads to poor performance of the ensemble classifier because then, in this example, the individual classifier with the highest influence is also making the worst predictions. Data chunk overlaps allow there to always be multiple recent data chunks. In other words, in the case of, for example two recent data chunks, one can imagine having a more mature "master" data chunk, and an immature "apprentice" data chunk. Once the apprentice data chunk reaches data maturity or mastery, a data chunk transition happens, i.e. a new apprentice data chunk is created to work together with the old apprentice. The two related parameters to chunk overlap are overlap percentage and stack depth.

Here, overlap percentage refers to which percentage data samples exist in multiple data chunks. As explained before, a 10% overlap means that, if sampled randomly, only 10% of the samples' data points would be present in multiple data chunks. 100% overlap would mean that every sample is present in multiple data chunks. Coupled with data chunk width, this parameter controls when a new data chunk must be created. A 100% overlap with a chunk width of three weeks means that a new data chunk must be created every 1.5 weeks to maintain the correct overlap. In the present example, the overlap percentage is roughly about 20%.

Stack depth refers to the maximum number of data chunks a single data sample can be present within. A stack depth of two means that a data sample or data point can exist in at most two different data chunks. Combining stack depth with chunk overlap, a data chunk overlap of 100% with a stack depth of two means that every sample is present in exactly two data chunks. It is advantageous to maintain a stack depth of exactly two, just like in the master/apprentice metaphor described above.

On top of the timeline 20, there is a wedge 21 that extends along all the timeline 20. This wedge 21 represents the weight at specific points in time. As stated before, the weights can be applied to the respective data chunks or to the individual classifiers that are built on the respective data chunks to influence the respective influence on the outcome of the ensemble classifier. The weight, shown in arbitrary units, decreases from 1, e.g. for a present data chunk, to 0, e.g. for a data chunk that is e.g. older than four months, in the present example. The slope of the wedge 21 is determined by the weight-decay that describes how the weights decrease over time. A high weight-decay favors recent data chunks much more than a lower weight-decay, and vice versa. Most notably, this parameter influences how much of vehicle and user data must be stored. A high weight-decay requires less memory as older data becomes useless much quicker. The weight-decay can be chosen according to arbitrary schemes. In FIG. 3, a linear scheme is shown as an example, where the weights-decay by a fixed amount linearly from 1 to 0 within four months. Another possibility would be an exponential decay, e.g., where the weights decay by an amount relative to each other.

It is advantageous to use an exponential weight-decay of 0.79, that is, a data chunk or classifier has 0.79 of the weight of the next more recent data chunk or classifier. In particular, it is furthermore advantageous to discard the data chunks after a predefined time span, e.g. after ten months.

In the example shown in FIG. 3, the first data chunk, represented by the area 22, has a weight of one and extends to about six weeks from the end of April to the middle of March. The next data chunk, represented by area 24, has roughly a ten-day overlap with a first data chunk, and the filled area 23 represents this overlap. The weight of the next data chunk is about 0.7, as this is the weight associated with the start of the time interval that is represented by the area 24 in the current example. The third data chunk, represented by area 26, again with an overlap with the more recent second data chunk the overlap, in this example, being represented by the filled area 25, will have a weight of about 0.4. The last data chunk that is shown and that is represented by the area 28, again with an overlap with the precedent third data chunk, has a weight of about 0.15. Any older data chunk will have a weight of zero and, thus, does not need to be stored in the memory for the present example. As time goes by, a new data chunk will be created and the now first data chunk with the weight 1 will loose some of its weight and in consequence contributes less to the performance of the ensemble classifier.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for predicting an interface control action of a user with an in-vehicle user interface, the method comprising:
   collecting and storing data, wherein the data includes at least
   vehicle data about the vehicle and the vehicle's environment collected from at least one sensor of the vehicle, and
   user data about user interactions with the user interface and/or different applications inside the vehicle;
   assigning likelihoods to at least two possible interface control actions by the user based on the collected and stored data;
   determining at least one most likely interface control action from the likelihoods; and
   providing the user with the at least one most likely interface control action in a manner so that the at least one most likely interface control action is selectable and performable with one single user interaction with the user interface,
   wherein a classifier calculates likelihoods for the at least two possible interface control actions based on the collected and stored data and these calculated likelihoods are then assigned to the at least two possible interface control actions,
   wherein the classifier is an ensemble classifier with several individual classifiers, where each individual classifier is built on a data chunk of the collected and stored data,
   wherein each data chunk contains all data for a time interval specific for each data chunk and a time interval assigned to at least two data chunks overlap with each other, and
   wherein the overlap and a data chunk width controls when new data chunks are created.

2. The method of claim 1, wherein a larger likelihood is assigned to frequently used interface control actions compared to less frequently used interface control actions when assigning the likelihoods.

3. The method of claim 1, wherein a larger likelihood is assigned to recently used interface control actions compared to less recently used interface control actions when assigning the likelihoods.

4. The method of claim 1, wherein only data younger than a given age are taken into account when assigning the likelihoods.

5. The method of claim 1, wherein the step of collecting and storing data comprises collecting and storing of data about the user from and to a network external to the vehicle.

6. The method of claim 1, wherein the data chunks are weighted with a bias depending on an age of the collected data contained so that more weight is assigned to data chunks with recent data compared to less recent data.

7. The method of claim 6, wherein each data chunk contains all data stemming from a time interval specific for each data chunk, where time intervals assigned to one data chunk can overlap with time intervals assigned to other data chunks, so that specific data can be part of more than one data chunk.

8. An in-vehicle user interface, comprising:
   a memory configured to collect and store data, wherein the data includes at least
   vehicle data about the vehicle and the vehicle's environment collected from at least one sensor of the vehicle, and
   user data about user interactions with the user interface and/or different applications inside the vehicle;
   a processor coupled to the memory and configured to
   assign likelihoods to at least two possible interface control actions based on the collected and stored data, and
   determine at least one most likely interface control action from the likelihoods; and
   a display unit configured to provide the user with a set of the at least one most likely interface control action so that it is selectable and performable with one single user interaction with the user interface,
   wherein a classifier calculates likelihoods for the at least two possible interface control actions based on the collected and stored data and these calculated likelihoods are then assigned to the at least two possible interface control actions,
   wherein the classifier is an ensemble classifier with several individual classifiers, where each individual classifier is built on a data chunk of the collected and stored data,
   wherein each data chunk contains all data for a time interval specific for each data chunk and a time interval assigned to at least two data chunks overlap with each other, and
   wherein the overlap and a data chunk width controls when new data chunks are created.

9. The method of claim 1, wherein the several individual classifiers include a primary classifier that generates a first estimate of likelihoods and a further classifier to supplement the first estimate of likelihoods.

10. The method of claim 9, wherein the primary classifier is a naïve Bayes classifier and the further classifier is a random forest classifier.

11. A method for predicting an interface control action of a user with an in-vehicle user interface, the method comprising:

collecting and storing data, wherein the data includes at least
vehicle data about the vehicle and the vehicle's environment collected from at least one sensor of the vehicle, and
user data about user interactions with the user interface and/or different applications inside the vehicle;
assigning likelihoods to at least two possible interface control actions by the user based on the collected and stored data;
determining at least one most likely interface control action from the likelihoods; and
providing the user with the at least one most likely interface control action in a manner so that the at least one most likely interface control action is selectable and performable with one single user interaction with the user interface,
wherein a classifier calculates likelihoods for the at least two possible interface control actions based on the collected and stored data and these calculated likelihoods are then assigned to the at least two possible interface control actions,
wherein the classifier is an ensemble classifier with several individual classifiers, where each individual classifier is built on a data chunk of the collected and stored data,
wherein each data chunk contains all data for a time interval specific for each data chunk and a time interval assigned to at least two data chunks overlap with each other,
wherein the overlap and a data chunk width controls when new data chunks are created, and
wherein the overlap is based on overlap percentage, which is a percentage of data samples existing in multiple data chunks, and stack depth, which is a maximum number of data chunks a single data sample can he present within.

12. The in-vehicle user interface of claim 8, wherein the several individual classifiers include a primary classifier that generates a first estimate of likelihoods and a further classifier to supplement the first estimate of likelihoods.

13. The in-vehicle user interface of claim 12, wherein the primary classifier is a naïve Bayes classifier and the further classifier is a random forest classifier.

14. The in-vehicle user interface of claim 8, wherein the overlap is based on overlap percentage, which is a percentage of data samples existing in multiple data chunks, and stack depth, which is a maximum number of data chunks a single data sample can be present within.

* * * * *